Patented Apr. 6, 1954

2,674,519

UNITED STATES PATENT OFFICE 2,674,519

MANUFACTURE OF LEAD CYANIDE

Hymin Shapiro, Detroit, and Vincent F. Hnizda, Huntington Woods, Mich., and George Calingaert, Geneva, N. Y., assignors to Ethyl Corporation, New York, N. Y., a corporation of Delaware No Drawing. Application February 21, 1951, Serial No. 212,208

9 Claims. (Cl. 23—79)

Our invention relates to a novel, improved process for the manufacture of lead cyanide. In particular our invention resides in the manufacture of lead cyanide of high purity.

Lead cyanide has been known as a laboratory chemical for a number of years, but prior to our discovery of a practical method of manufacturing lead cyanide, it has been prepared by methods which do not lend themselves to commercial operations, and by methods which do not produce a pure product. Because of the insolubility of lead cyanide in common solvents, and in particular water, it is difficult to prepare pure lead cyanide starting with an impure preparation. Likewise, the tendency of lead cyanide to decompose in the presence of aqueous or acidic mixtures renders its purification difficult. This is the principal draw-back in the process which comprises treating lead oxy-cyanide with hydrogen cyanide, although this process has the further disadvantages of requiring expensive and hazardous intermediates.

Lead cyanide has high effectiveness as a sterilizing agent, fungicide and soil disinfectant. In the latter application, it exhibits a high degree of residual action.

It is, therefore, an object of our invention to provide a new chemical reaction. Another object of our invention is the direct preparation of lead cyanide by a method which produces a product requiring no further purification steps. Other objects will be apparent from a further description of our invention hereinafter.

The above and other objects of this invention are achieved by treating dihydrocarbonlead dicyanides at elevated temperatures to produce lead cyanide.

The dihydrocarbonlead dicyanides which comprise the raw materials for the process of our invention include the dialkyllead dicyanides, diaryllead dicyanides, and alkylaryllead dicyanides. Typical examples of each of these materials are diethyllead dicyanide, methylpropyllead dicyanide, diphenyllead dicyanide, phenyltolyllead dicyanide, phenylethyllead dicyanide, and analogous compounds thereto. However, since diethyllead dicyanide is most available, being prepared by treating tetraethyllead, an article of commerce, with chlorine, followed by treating the resulting diethyllead dichloride with a metal cyanide, the further description of our invention hereinafter will be principally descriptive of the preparation of lead cyanide from diethyllead dicyanide. However, it is to be understood that the general class of dihydrocarbonlead dicyanides is equally suited to our process and is, therefore, within the scope of our invention. The restriction of our discussion to diethyllead dicyanide is merely by way of convenience.

We have discovered that when diethyllead dicyanide is heated to a temperature in the neighborhood of 120° C. the principal products are lead cyanide, triethyllead cyanide, tetraethyllead, propionitrile and butane. However, at the temperature of decomposition all the products are volatile with the exception of lead cyanide, which remains as a residue in the reaction vessel and is therefore produced in a state of high purity. Since the decomposition can be carried out on pure diethyllead dicyanide there are no extraneous contaminants such as solvent, inert reaction media, etc. to contaminate the product. The temperature of our reaction is not critical and we can obtain the desired decomposition of diethyllead dicyanide at a temperature between the limits of about 120 to 260° C., although we prefer to operate in the temperature range of 120 to 155° C. When other dihydrocarbonlead dicyanides are decomposed by the process of our invention somewhat different temperatures are preferred in each case, although in general the temperature limits of 50 to 260° C. encompass the preferred temperatures of the individual compounds decomposed. In general, we have found that the dialkyllead dicyanides can be decomposed at somewhat lower temperatures than the diaryllead dicyanides and that the preferred temperature for the decomposition of the mixed alkylaryllead dicyanides is intermediate to these two extremes.

The production of triethyllead cyanide as one of the decomposition products does not reduce the ultimate yield of lead cyanide, as we have found that the amount of lead cyanide produced is greater than that which could be accounted for by the direct production of the intermediate products enumerated above. This results because the triethyllead cyanide, produced initially, itself partially decomposes before leaving the reaction zone to produce tetraethyllead and additional diethyllead dicyanide. Thus the initial starting material is regenerated and the series of decomposition reactions is continued to produce additional lead cyanide and the other products enumerated above. Furthermore, we can recycle that triethyllead cyanide which escapes from the decomposition zone, and thereby further increase the yield of lead cyanide produced in each stage of the reaction. Typical examples of methods of producing lead cyanide by our process follow wherein all parts and percentages are by weight.

Example

A reaction vessel which is provided with means for supplying heat and vacuum was connected to a sublimate receiver maintained at a temperature of 25° C., and a liquid condensate receiver maintained at a temperature of −80° C. Diethyllead dicyanide in the amount of 100 parts was introduced to the reaction vessel and the contents were heated to a temperature of 120° C. at which temperature the decomposition progressed at a measurable rate. Further heating was continued until a temperature of 155° C. had been reached during a period of two hours, at which time the temperature of the reaction vessel was reduced to 25° C. and the solid residue was removed. This residue consisted of 43 parts of lead cyanide containing 79.9 per cent lead, and which is the calculated composition of lead cyanide. In the sublimate receiver a solid material was recovered amounting to 44 parts which was shown by analysis to be relatively pure triethyllead cyanide, as it contained 63.3 per cent lead, and 7.8 per cent cyanide, while triethyllead cyanide theoretically contains 64.8 per cent lead and 8.1 per cent cyanide. The liquid condensate trap contained a mixture of tetraethyllead and propionitrile in the amount of 5 parts of tetraethyllead and 8.6 parts of propionitrile, as determined by fractional distillation of this liquid product. In addition a small amount of butane was removed from the system as a gas and its identity shown by density analysis.

In other operations similar to the foregoing example, we conducted the decomposition at various higher final temperatures, as high as 260° C., with results comparable to those detailed above.

In order to increase the production of lead cyanide from the dihydrocarbonlead dicyanide the sublimate consisting of trihydrocarbonlead cyanide either can be submitted to a separate decomposition process wherein it replaces the dihydrocarbonlead dicyanide of the above two examples, or it may be introduced into the reaction vessel along with the dihydrocarbonlead dicyanide and the operations as above conducted in a similar manner.

We have described typical methods of producing lead cyanide by a thermal process wherein dihydrocarbonlead dicyanides are decomposed. Other methods of conducting our process will be apparent to those skilled in the art and other materials suitable for this process will also be apparent.

We claim:

1. A process for the manufacture of lead cyanide, which comprises decomposing by heating an organo lead cyanide containing at least two organic radicals, recovering the lead cyanide as a solid residue, and removing all other products by volatilization.

2. A process for the manufacture of lead cyanide, which comprises decomposing by heating a diorgano lead dicyanide, recovering the lead cyanide as a solid residue, and removing all other products by volatilization.

3. The process of claim 2 wherein the diorgano lead cyanide is diethyl lead dicyanide.

4. A process for the manufacture of lead cyanide, which comprises decomposing by heating a triorgano lead cyanide, recovering the lead cyanide as a solid residue, and removing all other products by volatilization.

5. The process of claim 4 wherein the triorgano lead cyanide is triethyl lead cyanide.

6. A process for the manufacture of lead cyanide, which comprises heating a diorgano lead dicyanide at a temperature between about 50° C. and about 260° C., removing triorgano lead cyanide, tetraorgano lead, and other gaseous by-products by volatilization, recovering the lead cyanide as a solid residue.

7. The process of claim 6 wherein the triorgano lead cyanide is recycled and further decomposed to produce additional lead cyanide.

8. The process for the manufacture of lead cyanide which comprises decomposing by heating a dialkyl lead dicyanide, recovering the lead cyanide as a solid residue, and removing all other products by volatilization.

9. A process for the manufacture of lead cyanide, which comprises heating diethyl lead dicyanide at a temperature between about 120° C. and 155° C., removing triethyl lead cyanide, tetraethyl lead, and other gaseous by-products by volatilization, and recovering the lead cyanide as a solid residue.

References Cited in the file of this patent

Krause, "Di Chemie der Metall-organischen Vergindungen," page 402.

Text Book of Inorganic Chemistry (1928), vol. XI, part I, page 347.

Beilstein, vol. IV, 2nd Supp., page 1020.